May 28, 1957 V. E. PAINTER 2,793,838
FLAVOR MIXING EXTRUSION HEAD
Filed Sept. 8, 1955 2 Sheets-Sheet 1
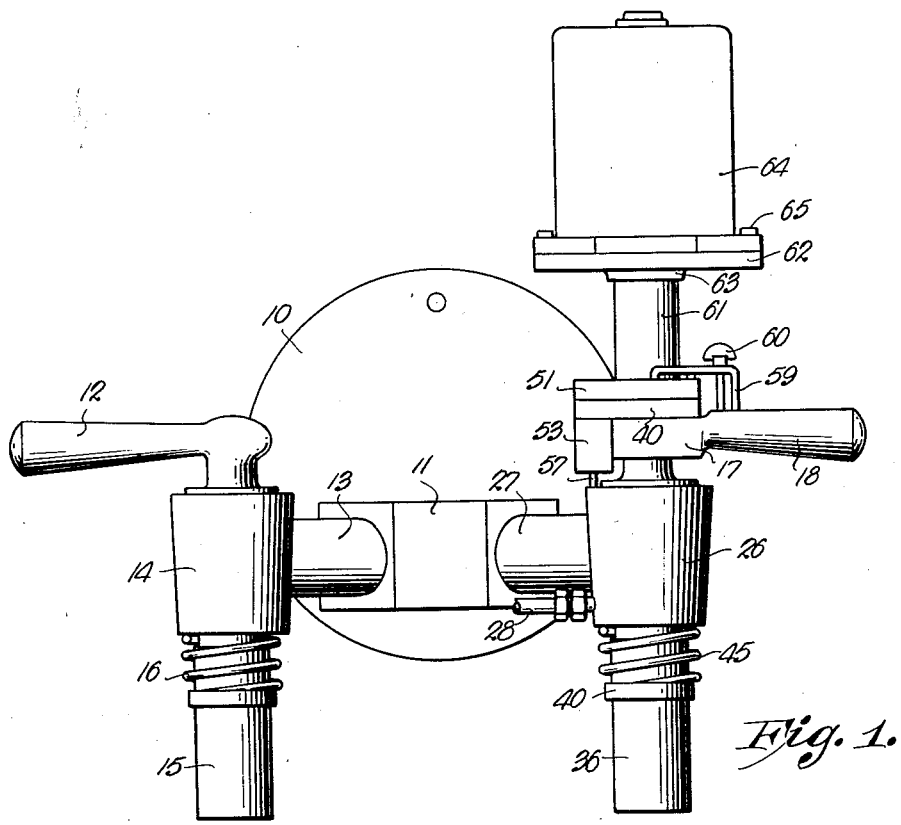
Fig. 1.
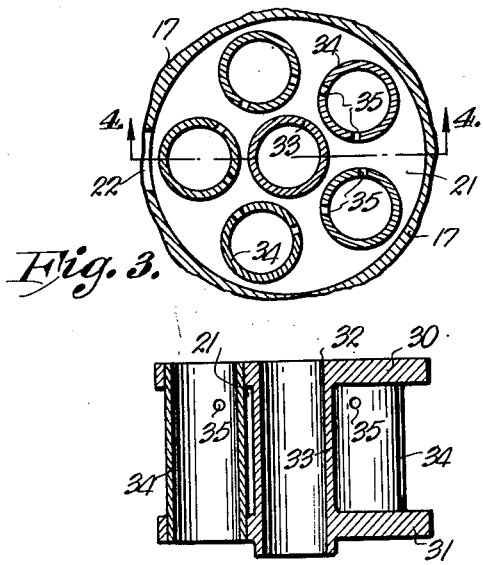
Fig. 3.
Fig. 4.
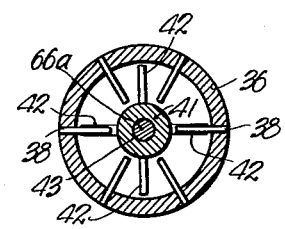
Fig. 5.
INVENTOR.
Virgil E. Painter
BY
Thos. E. Scofield
ATTORNEY.

INVENTOR.
Virgil E. Painter

United States Patent Office 2,793,838
Patented May 28, 1957

2,793,838
FLAVOR MIXING EXTRUSION HEAD

Virgil E. Painter, Newton, Iowa, assignor to Tony B. Lumpkin, Thomas Hocker, O. G. Hocker, and Virgil E. Painter, a partnership doing business as Dairy Queen Company, Mexico, Mo.

Application September 8, 1955, Serial No. 533,189

6 Claims. (Cl. 259—23)

This invention relates to extrusion heads for controlably flowing frozen dairy products from frozen dairy product formulation machines and refers more particularly to such an extrusion head which, in addition to flowing the frozen material from the machine, adds thereto a flavor and intimately mixes it therewith before extrusion from the extrusion head.

An object of the present invention is to provide a flavor mixing extrusion head for use on frozen dairy product production machines wherein a flavoring material and the frozen dairy product are intimately mixed one with the other before extrusion from the head.

Another object of the present invention is to provide a flavor mixing extrusion head for frozen dairy product production machines wherein a flavoring material and the frozen dairy product are intimately mixed in the single extrusion head before being extruded from the head.

Another object of the present invention is to provide an extrusion head for frozen dairy product formulating machines wherein a flavoring material is injected into the frozen dairy product as it flows through the extrusion head and the flavoring material and frozen dairy product are intimately mixed by mechanical agitation therein.

Another object of the invention is to provide a single extrusion head for frozen dairy product formulation machines, which head includes an input means for frozen dairy product, an input means for flavoring material, means for intermingling the flavoring material and frozen dairy product and means for agitating the frozen dairy product and flavoring material together and intimately mixing them one with the other before extrusion from the head.

Another object of the invention is to provide an extrusion head for frozen dairy product formulation machines as described wherein the means for agitating and mixing the frozen dairy product and flavoring material together are positioned in the extrusion head, the drive means for the agitating means is positioned directly thereabove and the drive shaft connecting the drive means and the agitating means extends through the extrusion head.

Still another object of the present invention is to provide an extrusion head for frozen dairy product formulation machines as described wherein the drive means for the agitating mechanism in the extrusion head is controlled by the operation of valves controlling the flow of the flavoring material and frozen dairy product into the extrusion head so the drive means operates only when the valves are opened and the materials are flowing into and through the extrusion head.

Other and further objects of the invention will appear in the course of the following description.

In the drawing which forms a part of the specification and is to be read in conjunction therewith, an embodiment of the invention is shown and, in the various views, like numerals are employed to designate like parts.

Fig. 1 is a front view of a frozen dairy product formulation machine having a conventional extrusion head mounted thereon and also the inventive extrusion head mounted thereon.

Fig. 3 is a view taken along the lines 3—3 of Fig. 2 in the direction of the arrows.

Fig. 4 is a view taken along the lines 4—4 of Fig. 3 in the direction of the arrows.

Fig. 5 is a view taken along the lines 5—5 of Fig. 2 in the direction of the arrows.

Figure 2:
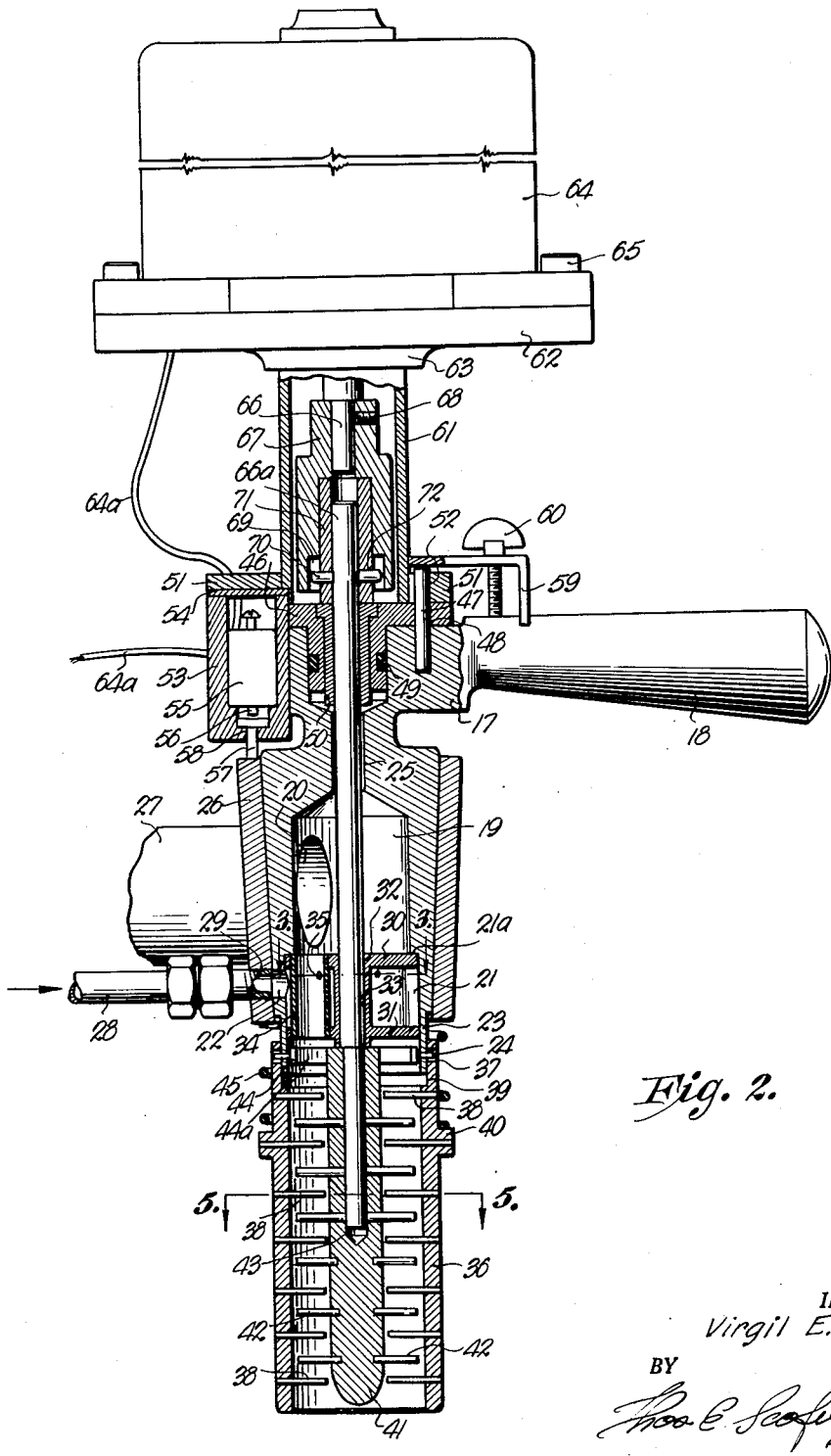
Fig. 2 is an enlarged front view with parts in section of the inventive frozen dairy product extrusion head illustrated in Fig. 1.

Referring to Fig. 1, the numeral 10 designates the front plate of a frozen dairy product formulating machine. Valve adapter block 11 has a conventional frozen dairy product extrusion head mounted thereon (at the left) and the inventive extrusion head also (at the right). The standard extrusion head has handle 12, input tube 13 and housing 14. Extrusion sleeve 15 is positioned relative housing 14 by spring 16. The pressurized frozen dairy product flows from the formulating machine through input tube 13 into housing 14 and out of extrusion sleeve 15 upon opening of an internal valve (not shown) in the housing upon manipulation of the handle 12. The conventional extrusion head thus operates merely as a controlled flow passageway and there is no processing or treating of the frozen dairy product in its passage therethrough.

On the right-hand side in Fig. 1 is shown the inventive flavor mixing extrusion head. This head will be described relative Fig. 2, which is a cross-sectional enlarged view thereof showing the internal details and operating structure. Referring then to Fig. 2, rotatable flavor valve 17 has handle 18 affixed thereto, frozen dairy product chamber 19 centrally positioned therein, inlet opening 20 in the wall thereof permitting access to the frozen dairy product chamber, enlarged flavoring material receiving chamber 21 positioned below the frozen dairy product receiving chamber with flavoring material inlet opening 22 in the side wall thereof and depending flange 23 with outwardly extending pins 24 positioned therein. Flavor valve 17 also has drive shaft enclosing opening 25 centrally positioned in the top portion thereof entering into the top of the frozen dairy product receiving chamber 19. The flavoring material receiving chamber 21 has circumferential walls of greater diameter than the frozen dairy product receiving chamber 19 thereby providing shoulder 21a at the upper end thereof.

The flavor valve assembly is positioned within stationary housing 26, which is supported by frozen dairy product input tube 27 attached to adapter block 11 on the front plate 10 of the frozen dairy product formulating machine. Housing 26 has an opening therethrough (not shown) with which the inlet 20 may register on manipulation of the handle 18 to rotate the flavor valve 17. Flavoring material input tube 28 is sealed into opening 29 in the housing 26. Flavoring material inlet opening 22 is registerable with opening 29 upon manipulation of the handle 18 in manner similar to the dairy product input opening 20. As the flavor valve 17 is one piece the input openings for the dairy product chamber 18 and flavor chamber 21 will always be opened and closed simultaneously.

A flavor proportioning element is positioned within the flavoring material receiving chamber 21. This flavor proportioning element is shown in detail in Figs. 3 and 4. Upper flange 30 and lower flange 31 abut sealingly the side walls of flavoring material receiving chamber 21 to aid in fixedly positioning the element in chamber 21. Centrally positioned drive shaft receiving opening 32 has longitudinal walls 33 extending through the flavor proportioning element. The flanges 30 and 31 are attached to walls 33. A plurality of walled tubes 34 are positioned between and penetrating the flanges 30 and 31, the outer diameter of the tube walls being less than the distance from the outer wall of the drive shaft cylinder 33 to the outer edge of the flanges 30 and 31. The tubes 34 are positioned equidistant from the walls 33 and the flange edges. Each tube 34 has preferably a pair of flavoring material introduction openings 35 positioned therein to permit influx of flavoring material from the flavoring material receiving chamber 21 into the tubes 34. As seen in Fig. 3 the openings 35 are preferably positioned next the central shaft walls 33 and preferably essentially 120° apart. This arrangement is critical. If the holes are not centrally positioned, the flavoring material will not be properly mingled with the dairy product but will merely coat the outside of the stream. The opening size is also fairly critical relative to the viscosity of the given flavoring material and dairy product. If too large, the dairy product will extrude into the flavor chamber, if too small, the quantity of flavor will be unsatisfactory.

Agitator sleeve 36, having L-shaped openings 37 in the top portion thereof to receive and engage pins 24 of flavor valve flange 23, depends from the lower end of this flange and has inwardly extending agitator pins 38 in the walls thereof. Sleeve 36 also has indented portion 39 on the inside wall thereof to receive flange 23 and outwardly extending spring shelf 40 positioned on the outside wall thereof. Rotating agitating cylinder 41 is positioned within said sleeve 36 and has outwardly extending agitator pins 42 mounted thereon to oppose pins 38 on the agitator sleeve 36. Well 43 in cylinder 41 receives the drive shaft in sealing fit. The flavor proportioning element is supported in chamber 21 by walls 33 resting on top of cylinder 41. Agitator disc 44 having four oval slots 44a therein to permit material passage therethrough is affixed to the upper end of agitating cylinder 41 and rotates therewith. Spring 45 abuts the lower end of housing 26 and the upper face of spring shelf 40 to position the agitator sleeve properly relative the housing 26.

Referring now to the upper portion of Fig. 2, upper shaft bearing assembly 46 is fixed relative to rotatable flavor valve 17 by location pin 47 through opening 48. O ring 49 prevents fluid leakage upwardly from shaft opening 25. Stationary teflon (tetrafluoroethylene resin) bearing 50 is fixedly mounted in upper shaft bearing assembly 46 by press fitting therein. Spacer flange 51 is engaged through opening 52 by pin 47. Flange 51 also serves as the top of microswitch casing 53. Gasket 54 seals the top of casing 53. Microswitch 55 is positioned within the casing 53 and has downwardly extending activation plunger 56. Microswitch activator pin 57 extends through opening 58 in the bottom of the microswitch casing 53. The spacer flange 51 is attached to the microswitch casing 53 by screws which are not shown in the figure. The microswitch activator pin 57 rides at its lower end on a bearing surface formed on the top of housing 26. The top of the housing 26 is angled to form a cam surface so when the handle 18 is manipulated to rotate the flavor valve 17 to open or close the flavor and dairy product openings (and therefore rotate also the microswitch casing which is attached to the spacer flange 51), the switch activator pin 57 will be cammed upwardly or downwardly respectively so when the openings are open the circuit in the microswitch will be activated and when they are closed the circuit is deactivated.

Hold down yoke 59 bears on the top of spacer flange 51 at one end and on the handle 18 of the other. Thumb screw 60 passes through an opening (not shown) in the yoke 59 and threads into the handle 18, thus serving as means for maintaining the spacer flange in proper relationship with the flavor valve 17 and holding the pin 47 in place. Drive motor spacer 61 is welded or brazed to spacer flange 51 and has platform 62 mounted at the top thereon through sleeve 63. Electric motor 64 is fixedly attached to platform 62 by bolts 65. Power lead 64a from a conventional source of electrical power (not shown) passes through microswitch 55 and connects to motor 64.

Upper drive shaft 66 extends downwardly from the motor 64 and is received in motor drive collar 67. Drive collar 67 is fixed to shaft 66 by set screw 68. Drive collar 67 has slot 69 in the lower portion thereof. As shown in the drawing, the upper drive shaft 66 ends in the drive collar 67 and the lower portion of the drive shaft (66a) has an opening (not shown) therethrough to receive drive pin 70. Retaining sleeve 71 has openings 72 therein also to receive the drive pin 70 and the ends of the pin 70 are held within groove or slot 69 of the drive collar 67. Retaining sleeve 71 rides on the top of the teflon bearing 50.

To dismantle the flavor mixing extrusion head assembly for cleaning, the thumb screw 60 is removed from handle 18, and the hold down yoke 59 is removed. The motor 64, platform 62, sleeve 63, drive motor spacer 61, spacer flange 51 with the attached microswitch casing 53 and the motor drive collar 67 may then be lifted off as a unit. Pin 47 remains in bearing assembly 46. At this time the agitator sleeve 36 may be removed by rotating it until the slots 37 permit removal of the sleeve from pins 24. Drive pin 70 is then pushed out of the openings 72 in the retaining sleeve and the opening in the drive shaft. The lower drive shaft 66a with the attached agitator 41 and the flavor proportioning element resting thereon may then be removed from the unit. The teflon bearing and the upper shaft bearing assembly 46 may then be lifted out of their receiving opening in the flavor valve 17, the retaining sleeve 72 having been removed after the removal of the pin and the sliding out of the lower drive shaft 66a.

In operation, when the extrusion head is closed to flow of frozen dairy products, the flavor valve assembly 17 is turned by handle 18 so that inlet openings 20 and 22 are out of registration with the frozen dairy product inlet opening from input tube 27 and flavoring material input tube 29. In this position, the microswitch 55 is deactivated by reason of the activating pin 57 abutting the lowest part of the cam portion of the housing 26. The motor 64 is therefore inoperative. To activate the extrusion head assembly for extrusion of flavor mixed frozen dairy products therefrom, the handle 18 is moved to the "open" position which registers the inlet openings 22 and 20 in the flavor valve with the respective housing openings. The microswitch housing 53, being attached to the spacer flange 51, also rotates with the flavor valve and the activator pin 57 is moved upwardly by the cam surface on top of housing 26 to engage microswitch plunger 56 and to activate the switch, thus permitting electrical power to flow through the power leads 64a to the motor 64. Due to the unitary flavor valve, as the frozen dairy product enters the frozen dairy product chamber 19, flavoring material enters the flavoring material chamber 21. When the flavor chamber 21 has filled up with the flavoring material, the flavoring material passes therefrom into the flavor openings 35 in the tubes 34. Frozen dairy product entering the tubes 34 from the chamber 19 therefore picks up some of the flavoring material in its passage therethrough and the combined flavoring material and frozen dairy product passes out of the tubes 34 into the annulus between the extrusion sleeve 36 and the agitating cylinder 41. By this time, the motor 64 is rotating the drive shafts 66 and 66a and attached agitating cylinder 41 having the agitator disc 44 and agitating pins 42 thereon. The flavoring material and frozen dairy product pass through the annulus between cylinder 41 and sleeve 36, being whipped, churned and agitated into a uniform mixture and thence extrude from the extrusion sleeve 36.

Return of the handle to its "off" position will again close the receiving chambers 19 and 21 and deactivate the microswitch 55, thus stopping the motor and the whirling of the agitating cylinder 41.

It should additionally be noted that by disconnecting the power leads to the motor so that the opening and closing of the flavor valve 17 does not cause rotation of the motor and agitator 41, the flow of flavoring material and dairy product through the quiescent structure of the extrusion head, the flavoring material being coated on the inner surfaces of the "tubes" of dairy product and the combination flowing out past the pins 38 and 42, produces a very attractive "revel" type of product with streaks and runs of flavor in the material rather than a uniformly mixed product.

From the foregoing it will be seen that this invention is one well adapted to attain all of the ends and objects hereinabove set forth, together with other advantages which are obvious and are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all material hereinabove set forth or shown in the drawings is to be interpreted as illustrative and not in a limiting sense.

Having thus described my invention, I claim:

1. A flavor mixing extrusion head for frozen dairy products having a flow passageway for frozen dairy products extending through said head, a chamber for receiving frozen dairy products positioned at the upper end of said passageway, an inlet opening for supplying frozen dairy products into said frozen dairy product chamber, valve means for opening and closing said inlet opening, a chamber for receiving flavoring material in said extrusion head below the frozen dairy product receiving chamber, an inlet opening for supplying flavoring material into said flavoring material chamber, valve means for opening and closing the inlet into said flavoring material chamber, a plurality of enclosed passageways for frozen dairy products through said flavoring material receiving chamber, a plurality of inlet openings communicating between the flavoring material receiving chamber and the frozen dairy product passages to permit influx of flavoring material into each passageway, and agitating means in the extrusion head flow passageway below the flavoring material receiving chamber for intermingling the frozen dairy product and flavoring material.

2. A flavor mixing extrusion head as in claim 1 wherein the plurality of openings between the flavoring material receiving chamber and frozen dairy product passageways consists of one inlet per passageway.

3. A flavor mixing extrusion head for frozen dairy products comprising a flavor valve housing having a central annulus extending therethrough, an inlet opening into an upper portion of said housing annulus for input of frozen dairy products, an inlet opening into a lower portion of said housing annulus for input of flavoring material, a flavor valve rotatably fitting into said housing annulus, a central passage within said valve extending from at least one end thereof, inlet openings for frozen dairy product and flavoring material in said valve registrable with the housing openings on rotation of the valve, means attached to said valve for rotating it in said housing, a flavor proportioning element in the valve passageway opposite the flavor input opening, said flavor proportioning element having upper and lower walls positioned above and below the flavor input opening to prevent the flow of flavoring material into the flavor valve passageway, at least one hollow walled tube penetrating said upper and lower walls to permit passage of frozen dairy product past the closed off flavor input area, at least one input opening in the wall of said tube to permit influx of flavoring material into the frozen dairy product as it passes through the tube, and agitating means below said tube for intermingling the frozen dairy product and flavoring material before they issue from the flavor valve passageway.

4. A flavor mixing extrusion head for frozen dairy products comprising a flavor valve housing having a central annulus extending therethrough, an inlet opening into an upper portion of said annulus for input of frozen dairy products, an inlet opening into a lower portion of said annulus for the input of flavoring material, a flavor valve rotatably fitting into said housing annulus, a central passage in said valve extending at least from one end thereof, inlet openings for frozen dairy product and flavoring material in said valve registrable with the housing openings on rotation of the valve, means for rotating said valve in the housing, a flavor proportioning element in the valve passageway opposite the flavor input opening, said flavor proportioning element having upper and lower walls positioned above and below the flavor input opening to prevent flow of flavoring material into the flavor valve passageway, a plurality of hollow walled tubes penetrating said upper and lower walls to permit passage of frozen dairy product past the closed off flavor input area, and at least one input opening in the wall of each tube to permit influx of flavoring material into the frozen dairy product as it passes through said tubes, and agitating means in the flavor valve passageway below the tubes for intermingling the frozen dairy product and flavoring material before their extrusion from the head.

5. A flavor valve as in claim 4 including a plurality of input openings into each tube.

6. A flavor mixing extrusion head as in claim 4 wherein said input openings to said tubes are positioned centrally relative the flavor valve passageway.

References Cited in the file of this patent

UNITED STATES PATENTS

| | | |
|---|---|---|
| 1,416,307 | Severson | May 16, 1922 |
| 1,630,695 | England | May 31, 1927 |